United States Patent
Wang et al.

(10) Patent No.: US 11,328,653 B1
(45) Date of Patent: May 10, 2022

(54) DETECTION DEVICE FOR DETECTING A RECEIVING CARD REMOVABLY INSERTED INTO AN INSERTION SLOT OF A LIGHT-EMITTING DIODE DISPLAY SYSTEM

(71) Applicant: Top Victory Investments Limited, Hong Kong (HK)

(72) Inventors: Ching-Liang Wang, New Taipei (TW); Li-Wei Lin, New Taipei (TW)

(73) Assignee: Top Victory Investments Limited, Hong Kong (HK)

( * ) Notice: Subject to any disclaimer, the term of this patent is extended or adjusted under 35 U.S.C. 154(b) by 0 days.

(21) Appl. No.: 17/327,357

(22) Filed: May 21, 2021

(30) Foreign Application Priority Data

Jan. 18, 2021 (TW) .................................. 110101788

(51) Int. Cl.
*G09G 3/20* (2006.01)
*G09G 3/32* (2016.01)
*G06F 3/14* (2006.01)

(52) U.S. Cl.
CPC ......... *G09G 3/2096* (2013.01); *G06F 3/1423* (2013.01); *G09G 3/32* (2013.01)

(58) Field of Classification Search
CPC ...... G09G 3/2096; G09G 3/32; G06F 3/1423; G06F 3/0679; G06Q 20/357; G06Q 20/34; G11C 16/26; G11C 16/08; G11C 16/004; G16H 50/20; G16H 50/30
See application file for complete search history.

(56) References Cited

U.S. PATENT DOCUMENTS 2,815,801 A    12/1957    Fingerhut et al.

FOREIGN PATENT DOCUMENTS

| AU | 609021 B3 | 2/1991 |
|---|---|---|
| EP | 1 985 202 A1 | 10/2008 |
| EP | 3 228 225 A1 | 10/2017 |
| GB | 2507537 A | 5/2014 |
| GR | 20080100336 A | 12/2009 |
| JP | 2005-86393 A | 3/2005 |

OTHER PUBLICATIONS

Search Report issued to European counterpart application No. 21168988 by the EPO dated Oct. 4, 2021 (8 pages).

*Primary Examiner* — Michael A Faragalla
*Assistant Examiner* — Sujit Shah
(74) *Attorney, Agent, or Firm* — Hamre, Schumann, Mueller & Larson, P.C.

(57) ABSTRACT

A detection device for an insertion slot of an LED display system is provided. When a first receiving card is inserted in the insertion slot, the detection device outputs, to a display panel of the LED display system, a first data output with reference to an image signal outputted by the first receiving card. When a second receiving card is inserted in the insertion slot, the detection device outputs a high-impedance signal to the second receiving card to enable the second receiving card to generate an enabling output, generates a second data output with reference to the enabling output and the image signal outputted by the second receiving card, and transmits the second data output to the display panel.

13 Claims, 5 Drawing Sheets

DETECTION DEVICE FOR DETECTING A RECEIVING CARD REMOVABLY INSERTED INTO AN INSERTION SLOT OF A LIGHT-EMITTING DIODE DISPLAY SYSTEM

CROSS-REFERENCE TO RELATED APPLICATION

This application claims priority to Taiwanese Invention Patent Application No. 110101788, filed on Jan. 18, 2021.

FIELD

The disclosure relates to a detection device, and more particularly to a detection device for detecting a receiving card removably inserted into an insertion slot of a light-emitting diode display system.

BACKGROUND

Generally, a conventional light-emitting diode (LED) display system is configured to display an image based on an image signal provided by an external media source (e.g., a computer, a multimedia player, a video recorder, etc.). The conventional LED display system includes an insertion slot allowing a receiving card to be inserted thereinto, a signal-generating unit, and a display panel. The receiving card receives the image signal from a transmitter that is configured to receive the image signal from the external media source and to transmit the image signal to the receiving card, and then transmits the image signal to the signal-generating unit. The signal-generating unit processes the image signal to generate image data, and transmits the image data to the display panel to enable the display panel to display the image based on the image data.

However, the receiving card has to match the transmitter; that is to say, the receiving card and the transmitter have to be products of the same brand. When it is required to replace the receiving card of the conventional LED display system with a receiving card provided by another brand, it is necessary to redesign the conventional LED display system. At present, it is necessary to independently design different LED display systems respectively for requirements of different brands, which is a waste of research and development resources.

SUMMARY

Therefore, an object of the disclosure is to provide a detection device that is for detecting a receiving card removably inserted into an insertion slot of a light-emitting diode (LED) display system and that can alleviate at least one of the drawbacks of the prior art.

According to one aspect of the disclosure, a detection device is provided for detecting a receiving card removably inserted into an insertion slot of a light-emitting diode (LED) display system. The LED display system includes the insertion slot and a display panel. The insertion slot allows a receiving card to be removably inserted therein, and the receiving card is one of a first card and a second card that are different types of receiving cards and that respectively output different identification signal outputs. The second card is configured to further output a control signal output.

The detecting device includes a detecting unit, a buffer unit and a signal-generating unit.

The detecting unit is adapted to receive a first supply voltage, and to be electrically connected to the insertion slot to receive therefrom the identification signal output outputted by the receiving card inserted into the insertion slot. The detecting unit is configured to generate a first detection signal and a second detection signal based on the identification signal output received from the insertion slot. The first and second detection signals have different phases that are opposite to each other and that vary according to the type of the receiving card inserted into the insertion slot. The detecting unit is further configured to generate a voltage output with reference to the first and second detection signals and the first supply voltage. The voltage output has a voltage value that varies according to the first and second detection signals.

The buffer unit is adapted to receive the first supply voltage, and to be electrically connected to the insertion slot. The buffer unit is electrically connected to the detecting unit to receive the voltage output and the first detection signal therefrom. The buffer unit is configured, when the receiving card inserted into the insertion slot is the second card, to receive the control signal output from the insertion slot, to generate a high-impedance signal and a set of enabling signals according to the first detection signal that is generated by the detecting unit based on the identification signal output outputted by the second card, and to transmit the high-impedance signal to the receiving card through the insertion slot to enable the receiving card to generate an enabling output according to the high-impedance signal. The buffer unit is further configured to generate a buffered output based on the control signal output and the set of enabling signals according to the voltage output and the first detection signal, and to transmit the buffered output to the display panel.

The signal-generating unit is adapted to receive the first supply voltage, and to be electrically connected to the insertion slot to receive therefrom an image signal outputted by the receiving card inserted into the insertion slot. The signal-generating unit is electrically connected to the detecting unit to receive the voltage output and the second detection signal. The signal-generating unit is configured, when the receiving card inserted into the insertion slot is the first card, to generate a first data output with reference to the first supply voltage, the voltage output, the second detection signal, and the image signal that is outputted by the first card, and to transmit the first data output to the display panel to enable the display panel to display an image. The signal-generating unit is further configured, when the receiving card inserted into the insertion slot is the second card, to further receive the enabling output from the insertion slot, to generate a second data output with reference to the first supply voltage, the voltage output, the second detection signal, the enabling output, and the image signal that is outputted by the second card, and to transmit the second data output to the display panel to enable the display panel to display an image.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
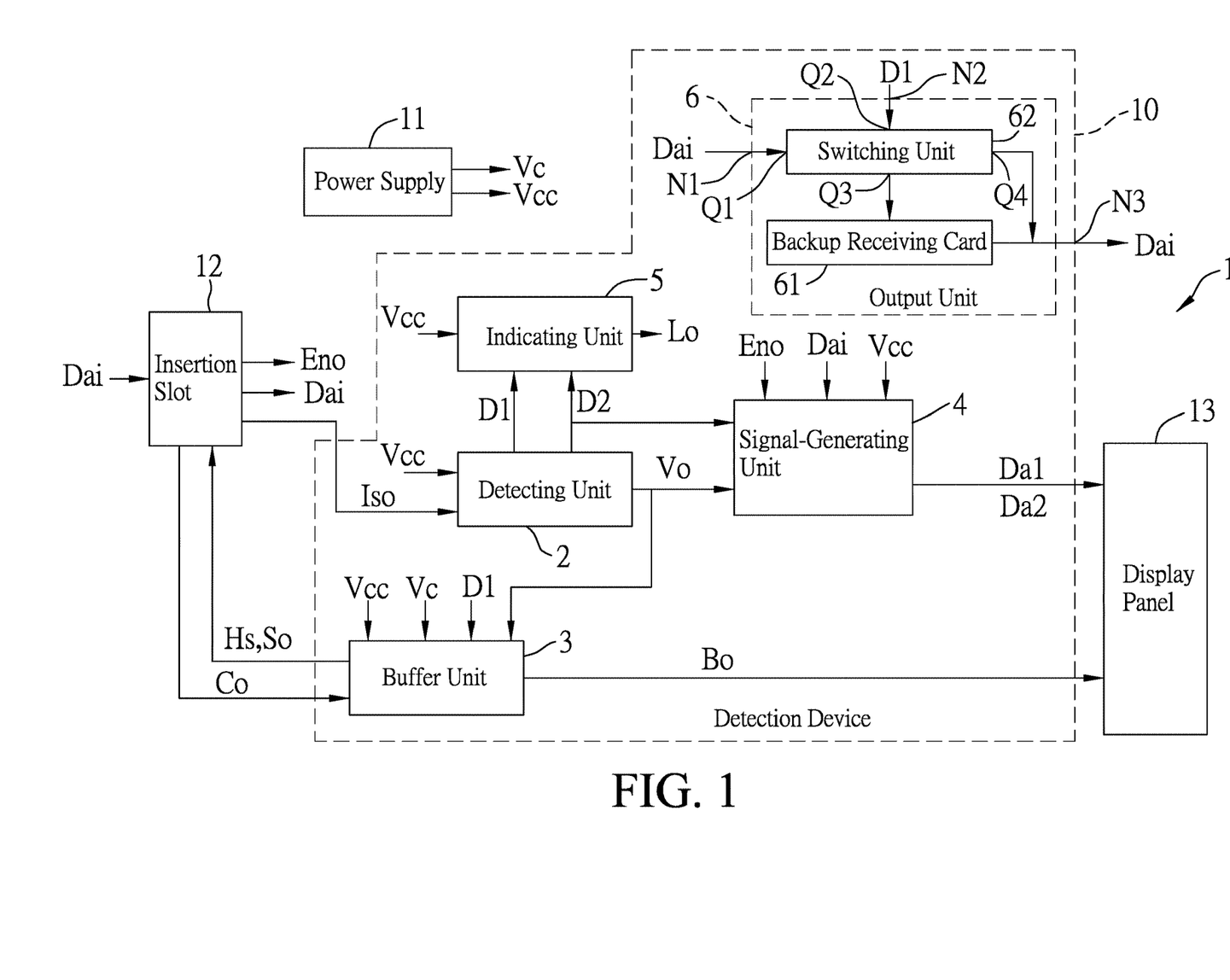
FIG. 1 is a block diagram illustrating a detection device included in a light-emitting diode display system according to an embodiment of this disclosure.

Referring to FIG. 1, a detection device 10 is adapted for a light-emitting diode (LED) display system 1. The LED display system 1 includes the detection device 10, a power supply 11, an insertion slot 12 and a display panel 13. The display panel 13 is an LED display panel. It should be noted that the LED display system 1 may have other necessary components that are not shown in the drawings for the sake of brevity.

The power supply 11 is configured to provide a first supply voltage (Vcc) and a second supply voltage (Vc) that are required for operations of other components of the LED display system 1. Specifically, the first supply voltage (Vcc) has a voltage of 5 V, and the second supply voltage (Vc) has a voltage of 3.3 V.

The insertion slot 12 allows a receiving card (not shown) to be removably inserted therein. The detection device 10 is for detecting the receiving card inserted into the insertion slot 12. The receiving card may be one of a first card and a second card that are different types of receiving cards and that respectively output different identification signal outputs (Iso). For example, the first card is a receiving card developed by Novastar Tech Co., Ltd., and the second card is a receiving card developed by Brompton Technology Ltd. The receiving card is configured to receive from a transmitter an image signal (Dai) that is provided by an external media source (e.g., a computer, a multimedia player, a video recorder, etc.), and to transmit the image signal (Dai) and the identification signal output (Iso) to the detection device 10 through the insertion slot 12.

It should be noted that, when the receiving card inserted into the insertion slot 12 is the first card, the receiving card outputs the identification signal output (Iso) having a logic level of "0" to the detection device 10 through one or more pins of the insertion slot 12. On the other hand, when the receiving card inserted into the insertion slot 12 is the second card, the receiving card outputs the identification signal output (Iso) having a logic level of "1" to the detection device 10 through the one or more pins of the insertion slot 12. The receiving card inserted into the insertion slot 12 is referred to as "inserted receiving card" hereinafter.

Figure 2:
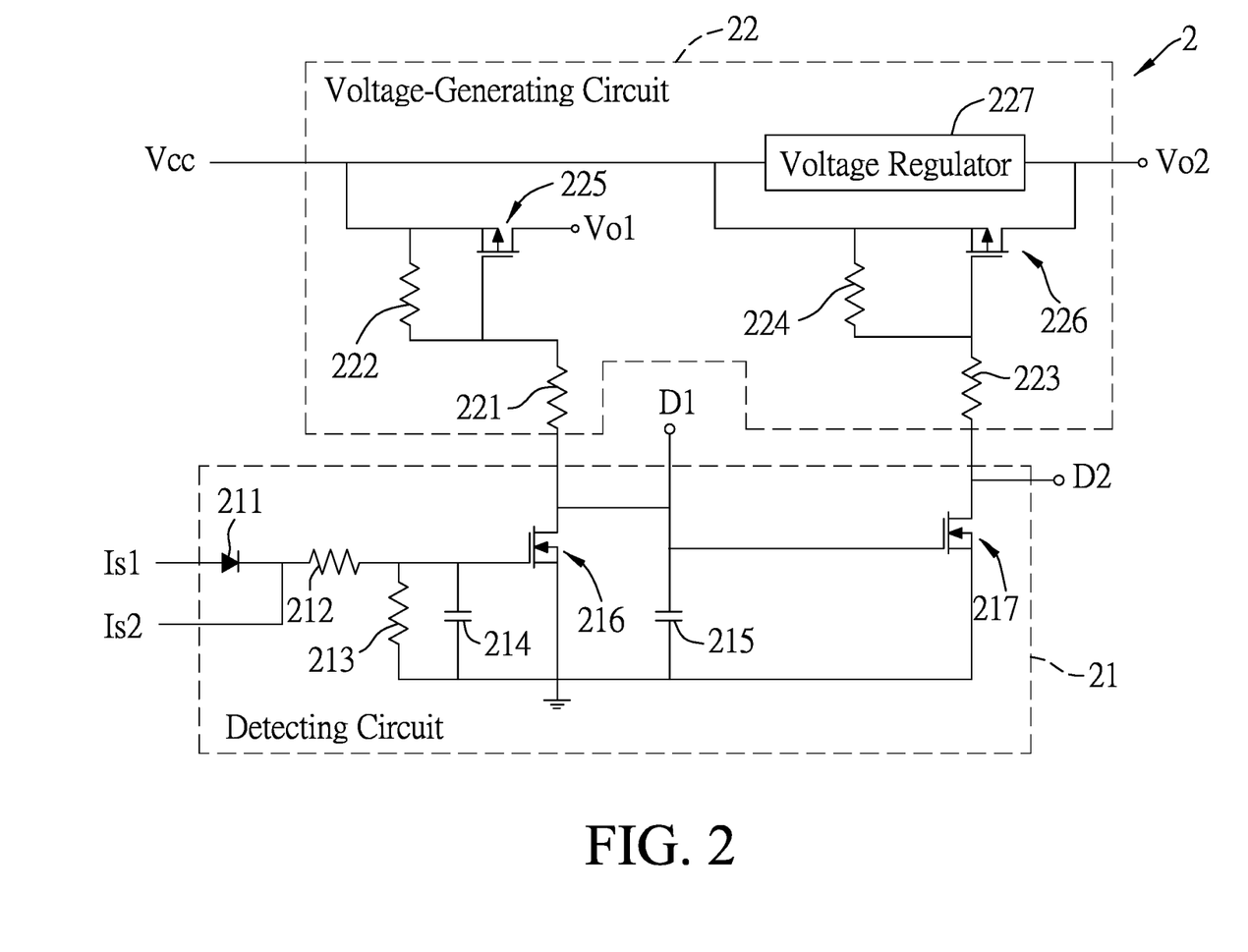
FIG. 2 is a circuit diagram of a detecting unit of the detection device according to an embodiment of this disclosure.

In some embodiments, the identification signal output (Iso) includes a first identification signal (Is1) and a second identification signal (Is2) (see FIG. 2). When the inserted receiving card is the first card, both the first and second identification signals (Is1, Is2) have the logic level of "0". When the inserted receiving card is the second card, the first identification signal (Is1) is a voltage signal having a voltage of 2.5 V, and the second identification signal (Is2) is a command signal indicating that the second card operates normally and having a nonzero logic level (i.e., not the logic level of "0").

The detection device 10 is configured to determine whether the inserted receiving card is the first card or the second card with reference to the identification signal output (Iso), then to operate accordingly to generate a first data output (Da1) or a second data output (Da2) based on the image signal (Dai), and to output the first or second data output (Da1, Da2) to the display panel 13 so as to enable the display panel 13 to display an image.

The detection device 10 includes a detecting unit 2, a buffer unit 3, a signal-generating unit 4, an indicating unit 5 and an output unit 6.

The detecting unit 2 is electrically connected to the power supply 11 to receive the first supply voltage (Vcc) therefrom, and is electrically connected to the insertion slot 12 to receive therefrom the identification signal output (Iso) outputted by the inserted receiving card. The detecting unit 2 is configured to generate a first detection signal (D1) and a second detection signal (D2) based on the identification signal output (Iso) received from the insertion slot 12; that is to say, the detecting unit is configured to determine whether the inserted receiving card is the first card or the second card. Then, the detecting unit 2 is configured to generate a voltage output (Vo) with reference to the first and second detection signals (D1, D2) and the first supply voltage (Vcc). The first and second detection signals (D1, D2) have different phases that are opposite to each other and that vary according to a type of the inserted receiving card. The voltage output (Vo) has a voltage value that varies according to the first and second detection signals (D1, D2). In some embodiments, the detecting unit 2 is configured to generate the voltage output (Vo) to include a first voltage signal (Vo1) and a second voltage signal (Vo2) (see FIG. 2).

Further referring to FIG. 2, the detecting unit 2 includes a detecting circuit 21 and a voltage-generating circuit 22. The detecting circuit 21 is electrically connected to the insertion slot 12 to receive the first and second identification signals (Is1, Is2) therefrom, and is configured to generate the first and second detection signals (D1, D2) based on the first and second identification signals (Is1, Is2) received from the insertion slot 12. The voltage-generating circuit 22 is electrically connected to the power supply 11 to receive the first supply voltage (Vcc) therefrom, and is electrically connected to the detecting circuit 21 to receive the first and second detection signals (D1, D2) therefrom. The voltage-generating circuit 22 is configured to generate the first voltage signal (Vo1) with reference to the first detection signal (D1) and the first supply voltage (Vcc), and to generate the second voltage signal (Vo2) with reference to the second detection signal (D2) and the first supply voltage (Vcc).

The detecting circuit 21 includes a diode 211, a first resistor 212, a second resistor 213, a first capacitor 214, a second capacitor 215, a first transistor 216 and a second transistor 217.

The diode 211 has an anode and a cathode, and is electrically connected to the insertion slot 12 to receive the first and second identification signals (Is1, Is2) at the anode and cathode, respectively. The first resistor 212 has a first end that is electrically connected to the cathode of the diode 211, and a second end. The second resistor 213 has a first end that is electrically connected to the second end of the first resistor 212, and a second end that is grounded. The first capacitor 214 is electrically connected to the second resistor 213 in parallel. The first transistor 216 has a first terminal, a second terminal that is grounded, and a control terminal that is electrically connected to the second end of the first resistor 212. The second capacitor 215 has a first end that is electrically connected to the first terminal of the first transistor 216, and a second end that is grounded. The second transistor 217 has a first terminal, a second terminal that is grounded, and a control terminal that is electrically connected to the first terminal of the first transistor 216. In some embodiments, each of the first and second transistors 216, 217 is a metal-oxide-semiconductor field-effect transistor (MOSFET) (e.g., an n-channel MOSFET), and the first terminal, the second terminal and the control terminal thereof are the drain terminal, the source terminal and the gate terminal, respectively.

The voltage-generating circuit 22 includes first to fourth resistors 221-224, a first transistor 225, a second transistor 226 and a voltage regulator 227.

The first resistor 221 has a first end, and a second end that is electrically connected to the detecting circuit 21 (specifically, connected to the first terminal of the first transistor 216) to receive the first detection signal (D1) therefrom. The second resistor 222 has a first end that is electrically connected to the power supply 11 to receive the first supply voltage (Vcc) therefrom, and a second end that is electrically connected to the first end of the first resistor 221. The first transistor 225 has a first terminal that is electrically connected to the first end of the second resistor 222, a second terminal, and a control terminal that is electrically connected to the second end of the second resistor 222. The third resistor 223 has a first end, and a second end that is electrically connected to the detecting circuit 21 (specifically, connected to the first terminal of the second transistor 217) to receive the second detection signal (D2) therefrom. The fourth resistor 224 has a first end that is electrically connected to the first end of the second resistor 222, and a second end that is electrically connected to the first end of the third resistor 223. The second transistor 226 has a first terminal that is electrically connected to the first end of the fourth resistor 224, a second terminal, and a control terminal that is electrically connected to the second end of the fourth resistor 224. The voltage regulator 227 is electrically connected to the power supply 11 to receive the first supply voltage (Vcc) therefrom, and is electrically connected between the first and second terminals of the second transistor 226. Specifically, the voltage regulator 227 has an input end electrically connected to the first terminal of the second transistor 226, and an output end electrically connected to the second terminal of the second transistor 226. In some embodiments, each of the first and second transistors 225, 226 is a p-channel MOSFET, and the first terminal, the second terminal and the control terminal thereof are the source terminal, the drain terminal and the gate terminal, respectively. In some embodiments, the voltage regulator 227 is a low-dropout regulator (LDO).

When the inserted receiving card is the first card, the first and second identification signals (Is1, Is2) having the logic level of "0" cause the first transistor 216 to not conduct and the second transistor 217 to conduct. As a result, the first transistor 216 outputs the first detection signal (D1) having a logic high level at the first terminal thereof, and the second transistor 217 outputs the second detection signal (D2) having a logic low level at the first terminal thereof. The logic-high first detection signal (D1) is then transmitted to the voltage-generating circuit 22 and causes the first transistor 225 to not conduct, so that the first transistor 225 outputs the first voltage signal (Vo1) having a voltage of 0 V at the second terminal thereof. Further, the logic-low second detection signal (D2) is transmitted to the voltage-generating circuit 22 and causes the second transistor 226 to conduct and to output a voltage signal based on the first supply voltage (Vcc) at the second terminal thereof. In this case, since a voltage at the input end of the voltage regulator 227 is not greater than a voltage at the output end of the voltage regulator 227, the voltage regulator 227 does not operate and the voltage signal outputted by the second transistor 226 serves as the second voltage signal (Vo2) (i.e., the second voltage signal (Vo2) has a voltage of 5 V).

When the inserted receiving card is the second card, the first and second identification signals (Is1, Is2) cause the first transistor 216 to conduct and the second transistor 217 to not conduct. As a result, the first transistor 216 outputs the first detection signal (D1) having a logic low level at the first terminal thereof, and the second transistor 217 outputs the second detection signal (D2) having a logic high level at the first terminal thereof. The logic-low first detection signal (D1) is then transmitted to the voltage-generating circuit 22 and causes the first transistor 225 to conduct, so that the first transistor 225 outputs at the second terminal the first supply voltage (Vcc) serving as the first voltage signal (Vo1). The logic-high second detection signal (D2) is transmitted to the voltage-generating circuit 22 and causes the second transistor 226 to not conduct, so that the voltage regulator 227 reduces the first supply voltage (Vcc) to output a reduced output voltage serving as the second voltage signal (Vo2) (i.e., the second voltage signal (Vo2) has a reduced voltage of 2.5 V).

Figure 3:
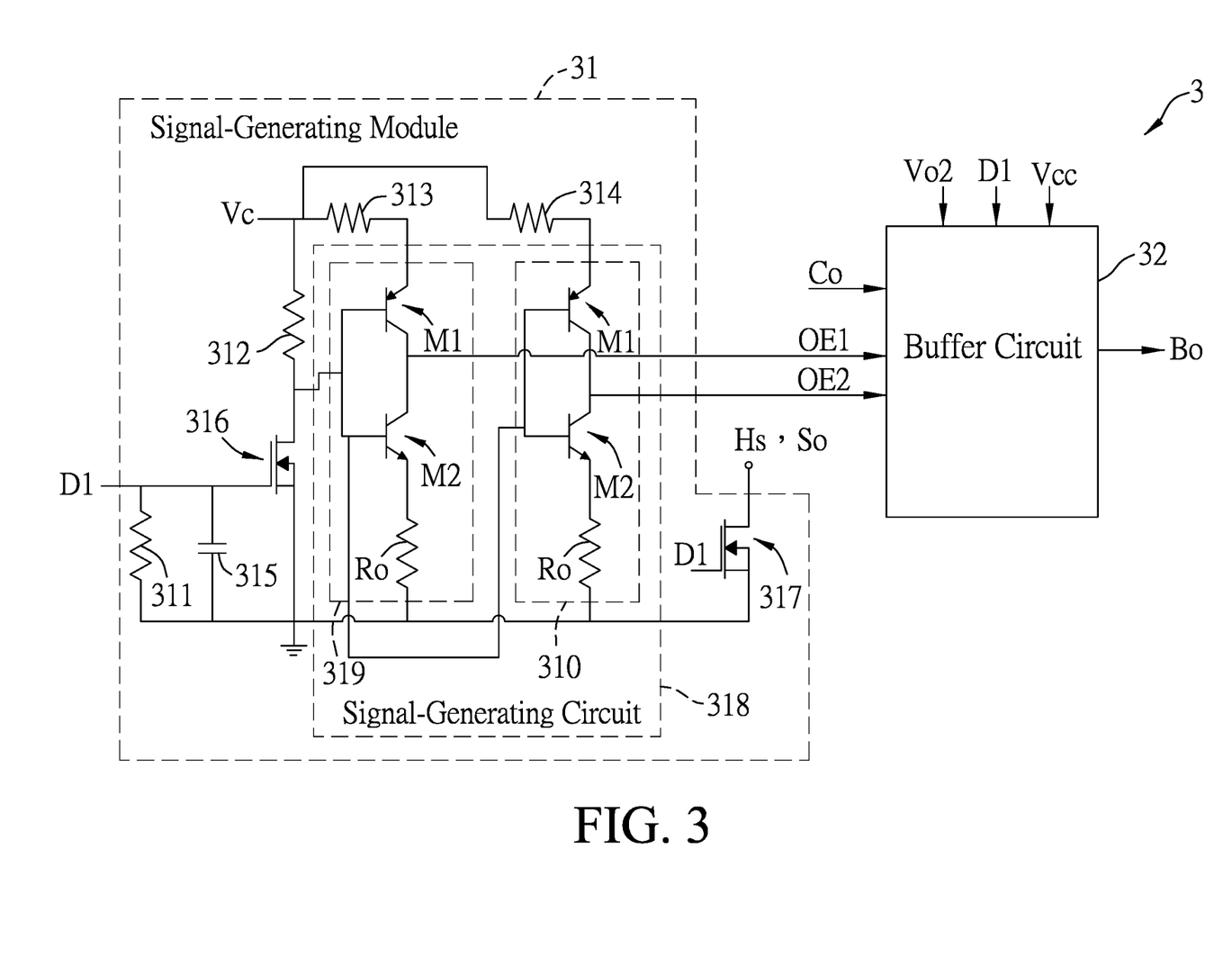
FIG. 3 is a circuit diagram of a buffer unit of the detection device according to an embodiment of this disclosure.

Referring to FIGS. 1 to 3, the buffer unit 3 is electrically connected to the power supply 11, the insertion slot 12 and the detecting unit 2. The buffer unit 3 receives the first supply voltage (Vcc) and the second supply voltage (Vc) from the power supply 11, and receives the second voltage signal (Vo2) of the voltage output (Vo) and the first detection signal (D1) from the detecting unit 2. When the inserted receiving card is the second card, the inserted receiving card outputs a control signal output (Co) to the buffer unit 3 via the insertion slot 12. The control signal output (Co) includes, for example but not limited to, a clock signal, a scan signal and a latch signal.

When the inserted receiving card is the second card, the buffer unit 3 is configured to generate a high-impedance signal (Hs) and a set of enabling signals according to the logic-low first detection signal (D1) that is generated by the detecting unit 2 based on the identification signal output (Iso) outputted by the second card. The set of enabling signals includes two enabling signals (OE1, OE2) and is used to enable the display panel 13. The buffer unit 3 transmits the high-impedance signal (Hs) to the inserted receiving card (i.e., the second card) through the insertion slot 12 to enable the inserted receiving card to generate an enabling output (Eno) according to the high-impedance signal (Hs). The buffer unit 3 is further configured to, according to the second voltage signal (Vo2) and the first detection signal (D1), generate a buffered output (Bo) based on the control signal output (Co) and the enabling signals (OE1, OE2), and to transmit the buffered output (Bo) to the display panel 13. In some embodiments, the enabling output (Eno) generated by the second card includes an enable signal (En), and a first clock signal (CLK1) and a second clock signal (CLK2) that have opposite phases (see FIG. 4).

When the inserted receiving card is the first card, the buffer unit 3 is configured to generate the enabling signals (OE1, OE2) and an output signal (So), rather than the high-impedance signal (Hs), according to the logic-high first detection signal (D1) that is generated by the detecting unit 2 according to the identification signal output (Iso) outputted by the first card. The output signal (So) has a logic level of "0" and is transmitted to the inserted receiving card (i.e., the first card) through the insertion slot 12. In this case, the buffer unit 3 does not output any signal to the display panel 13.

In some embodiments, the buffer unit 3 includes a signal-generating module 31 and a buffer circuit 32.

The signal-generating module 31 is electrically connected to the insertion slot 12, the power supply 11 and the detecting circuit 21 of the detecting unit 2. The signal-generating module 31 receives the second supply voltage (Vc) and the first detection signal (D1) from the power supply 11 and the detecting circuit 21, respectively. When the inserted receiving card is the second card, the signal-generating module 31 is configured to generate the high-impedance signal (Hs) and the enabling signals (OE1, OE2) according to the logic-low first detection signal (D1), and to transmit the high-impedance signal (Hs) to the inserted receiving card through the insertion slot 12. When the inserted receiving card is the first card, the signal-generating module 31 is configured, according to the logic-high first detection signal (D1), to generate the output signal (So), rather than the high-impedance signal (Hs), and to generate the enabling signals (OE1, OE2).

In some embodiments, the signal-generating module 31 includes first to fourth resistors 311-314, a capacitor 315, a first transistor 316, a second transistor 317 and a signal-generating circuit 318.

The first resistor 311 has a first end that is electrically connected to the detecting circuit 21 to receive the first detection signal (D1) therefrom, and a second end that is grounded. The capacitor 315 is electrically connected to the first resistor 311 in parallel. The first transistor 316 has a first terminal, a second terminal that is grounded, and a control terminal that is electrically connected to the first end of the first resistor 311. The second resistor 312 has a first end that is electrically connected to the power supply 11 to receive the second supply voltage (Vc), and a second end that is electrically connected to the first terminal of the first transistor 316. Each of the third and fourth resistors 313, 314 has a first end that is electrically connected to the power supply 11 to receive the second supply voltage (Vc), and a second end. The signal-generating circuit 318 is electrically connected to the first terminal of the first transistor 316 and the second ends of the third and fourth resistors 313, 314, and is configured to generate the enabling signals (OE1, OE2). The second transistor 317 has a first terminal that is electrically connected to the insertion slot 12, a second terminal that is grounded, and a control terminal that is electrically connected to the detecting circuit 21 to receive the first detection signal (D1) therefrom. The second transistor 317 is configured to output the high-impedance signal (Hs) or the output signal (So) at the first terminal thereof according to the first detection signal (D1). In some embodiments, each of the first and second transistors 316, 317 is an n-channel MOSFET, and the first terminal, the second terminal and the control terminal thereof are the drain terminal, the source terminal and the gate terminal, respectively.

The signal-generating circuit 318 includes two signal generators 319, 310 corresponding respectively to the third and fourth resistors 313, 314. Each of the signal generators 319, 310 is configured to output a respective one of the enabling signals (OE1, OE2), and includes an output transistor (M1), a switching transistor (M2) and a grounding resistor (Ro).

The output transistor (M1) has a first terminal that is electrically connected to the second end of the corresponding one of the third and fourth resistors 313, 314, a second terminal, and a control terminal that is electrically connected to the first terminal of the first transistor 316. The output transistor (M1) is configured to output the respective one of the enabling signals (OE1, OE2) at the second terminal thereof. Specifically, the first terminals of the output transistors (M1) of the signal generators 319, 310 are electrically connected to the second ends of the third and fourth resistors 313, 314, respectively; the output transistors (M1) of the signal generators 319, 310 are configured to output the enabling signals (OE1, OE2), respectively.

The switching transistor (M2) has a first terminal that is electrically connected to the second terminal of the output transistor (M1), a second terminal, and a control terminal that is electrically connected to the first terminal of the first transistor 316. The grounding resistor (Ro) has a first end that is electrically connected to the second terminal of the switching transistor (M2), and a second end that is grounded.

In this embodiment, the output transistor (M1) is a bipolar junction transistor (e.g., a PNP transistor), and the first terminal, the second terminal and the control terminal thereof are the emitter, the collector and the base of the PNP transistor, respectively. The switching transistor (M2) is a bipolar junction transistor (e.g., an NPN transistor), and the first terminal, the second terminal and the control terminal thereof are the collector, the emitter and the base of the NPN transistor, respectively.

When the first detection signal (D1) is logic low, the first transistor 316, the second transistor 317 and the output transistors (M1) do not conduct, and the switching transistors (M2) conduct. As a result, the second transistor 317 outputs the high-impedance signal (Hs) at the first terminal thereof, and the enabling signals (OE1, OE2) outputted by the output transistors (M1) are logic low.

When the first detection signal (D1) is logic high, the first transistor 316, the second transistor 317 and the output transistors (M1) conduct, and the switching transistors (M2) do not conduct. As a result, the second transistor 317 outputs the output signal (So) at the first terminal thereof, and the enabling signals (OE1, OE2) outputted by the output transistors (M1) are logic high.

The buffer circuit 32 is electrically connected to the power supply 11 to receive the first supply voltage (Vcc), electrically connected to the insertion slot 12 to receive the control signal output (Co), electrically connected to the detecting circuit 21 and the voltage-generating circuit 22 of the detecting unit 2 to respectively receive the first detection signal (D1) and the second voltage signal (Vo2), and electrically connected to the signal-generating module (31) to receive the enabling signals (OE1, OE2). When the inserted receiving card is the second card, the buffer circuit 32 is enabled according to the first detection signal (D1) that is generated based on the identification signal output (Iso) outputted by the second card, generates the buffered output (Bo) based on the control signal output (Co) and the enabling signals (OE1, OE2), and transmits the buffered output (Bo) to the display panel (13). On the other hand, when the inserted receiving card is the first card, the buffer circuit 32 is disabled according to the first detection signal (D1) that is generated based on the identification signal output (Iso) outputted by the first card, so that the buffer circuit 32 stops transmitting any signal to the display panel 13.

For example, the buffer circuit 32 may be a buffer amplifier used to perform buffering on the control signal output (Co) and the enabling signals (OE1, OE2), and accordingly the buffered output (Bo) actually includes the control signal output (Co) and the enabling signals (OE1, OE2) thus buffered.

Figure 4:
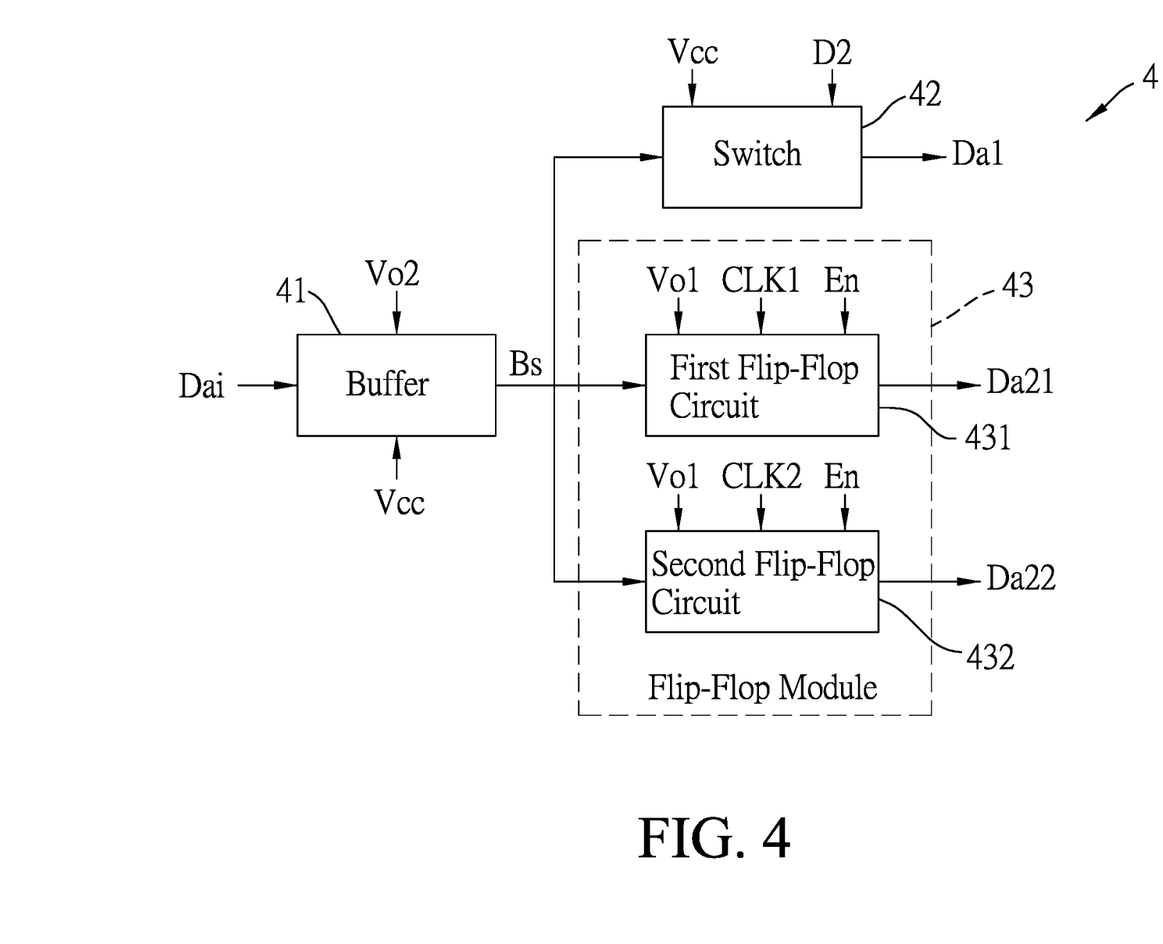
FIG. 4 is a block diagram of a signal-generating unit of the detection device according to an embodiment of this disclosure.

Referring to FIGS. 1, 2 and 4, the signal-generating unit 4 is electrically connected to the power supply 11 to receive the first supply voltage (Vcc), electrically connected to the insertion slot 12 to receive therefrom the image signal (Dai) outputted by the inserted receiving card, and electrically connected to the detecting unit 2 to receive the voltage output (Vo) and the second detection signal (D2). When the inserted receiving card is the first card, the signal-generating unit 4 generates the first data output (Da1) with reference to the first supply voltage (Vcc), the voltage output (Vo), the second detection signal (D2), and the image signal (Dai) that is outputted by the first card, and transmits the first data output (Da1) to the display panel 13 to enable the display panel 13 to display an image. When the inserted receiving card is the second card, the signal-generating unit 4 further receives the enabling output (Eno) outputted by the second card from the insertion slot 12, generates the second data output (Da2) with reference to the first supply voltage (Vcc), the voltage output (Vo), the second detection signal (D2), the enabling output (Eno), and the image signal (Dai) that is outputted by the second card, and transmits the second data output (Da2) to the display panel 13 to enable the display panel 13 to display an image. In this embodiment, the signal-generating unit 4 includes a buffer 41, a switch 42 and a flip-flop module 43.

The buffer 41 is electrically connected to the power supply 11 to receive the first supply voltage (Vcc), electrically connected to the insertion slot 12 to receive the image signal (Dai), and electrically connected to the voltage-generating circuit 22 of the detecting unit 2 to receive the second voltage signal (Vo2). The buffer 41 is configured to buffer the image signal (Dai) into a buffered signal (Bs); that is to say, the buffered signal (Bs) is the image signal (Dai) buffered by the buffer 41. The switch 42 is electrically connected to the power supply 11 to receive the first supply voltage (Vcc), electrically connected to the buffer 41 to receive the buffered signal (Bs) therefrom, and electrically connected to the detecting circuit 21 of the detecting unit 2 to receive the second detection signal (D2) therefrom. The flip-flop module 43 is electrically connected to the insertion slot 12 to receive the enabling output (Eno) therefrom, and is electrically connected to the buffer 41 and the detecting unit 2 to respectively receive the buffered signal (Bs) and the first voltage signal (Vo1).

When the inserted receiving card is the first card, the switch 42 is controlled by the second detection signal (D2) to output the first data output (Da1) based on the buffered signal (Bs), and the flip-flop module 43 does not receive the enabling output (Eno) and thus is disabled from generating the second data output (Da2). When the inserted receiving card is the second card, the switch 42 is controlled by the second detection signal (D2) to not output the first data output (Da1), and the flip-flop module 43 receives the enabling output (Eno) and thus is enabled by the enable signal (En) of the enabling output (Eno) to generate the second data output (Da2) based on the buffered signal (Bs) and the first and second clock signals (CLK1, CLK2) of the enabling output (Eno). For example, the switch 42 is a single pole single throw (SPST) switch controlled by the second detection signal (D2) to output the buffered signal (Bs) as the first data output (Da1) or not to output the buffered signal (Bs).

In this embodiment, the flip-flop module 43 includes a first flip-flop circuit 431 and a second flip-flop circuit 432. Each of the first and second flip-flop circuits 431, 432 is a D-type flip-flop.

The first flip-flop circuit 431 is electrically connected to the insertion slot 12 to receive the enable signal (En) and the first clock signal (CLK1) from the inserted receiving card, and is electrically connected to the buffer 41 and the voltage-generating circuit 22 of the detecting unit 2 to respectively receive the buffered signal (Bs) and the first voltage signal (Vo1). The first flip-flop circuit 431 is enabled by the enable signal (En) to generate a first data signal (Da21) based on the buffered signal (Bs) and the first clock signal (CLK1). The second flip-flop circuit 432 is electrically connected to the insertion slot 12 to receive the enable signal (En) and the second clock signal (CLK2) from the inserted receiving card, and is electrically connected to the buffer 41 and the voltage-generating circuit 22 of the detecting unit 2 to respectively receive the buffered signal (Bs) and the first voltage signal (Vo1). The second flip-flop circuit 432 is enabled by the enable signal (En) to generate a second data signal (Da22) based on the buffered signal (Bs) and the second clock signal (CLK2). The first and second data signals (Da21, Da22) are outputted to the display panel 13 to cooperatively serve as the second data output (Da2).

It should be noted that quantity of data contained in the image signal (Dai) originally outputted by the second card, which is a receiving card developed by Brompton Technology Ltd., is insufficient for the display panel 13 to display an image, and thus the flip-flop module 43 is required to make the second data output (Da2) have an increased quantity of data as compared to the image signal (Dai) when the inserted receiving card is the second card. For example, if the image signal (Dai) originally outputted by the second card has twelve sets of data, the second data output (Da2) generated by a signal-generating unit without the flip-flop module 43 also has twelve sets of data. The first and second flip-flop circuits 431, 432 are configured to cooperatively output the second data output (Da2) having twenty-four sets of data based on the twelve sets of data included in the image signal (Dai). Although the flip-flop module 43 exemplarily includes two flip-flop circuits (i.e., the first and second flip-flop circuits 431, 432) in the embodiment of FIG. 4, the flip-flop module 43 may include more than two flip-flop circuits in other embodiments.

Figure 5:
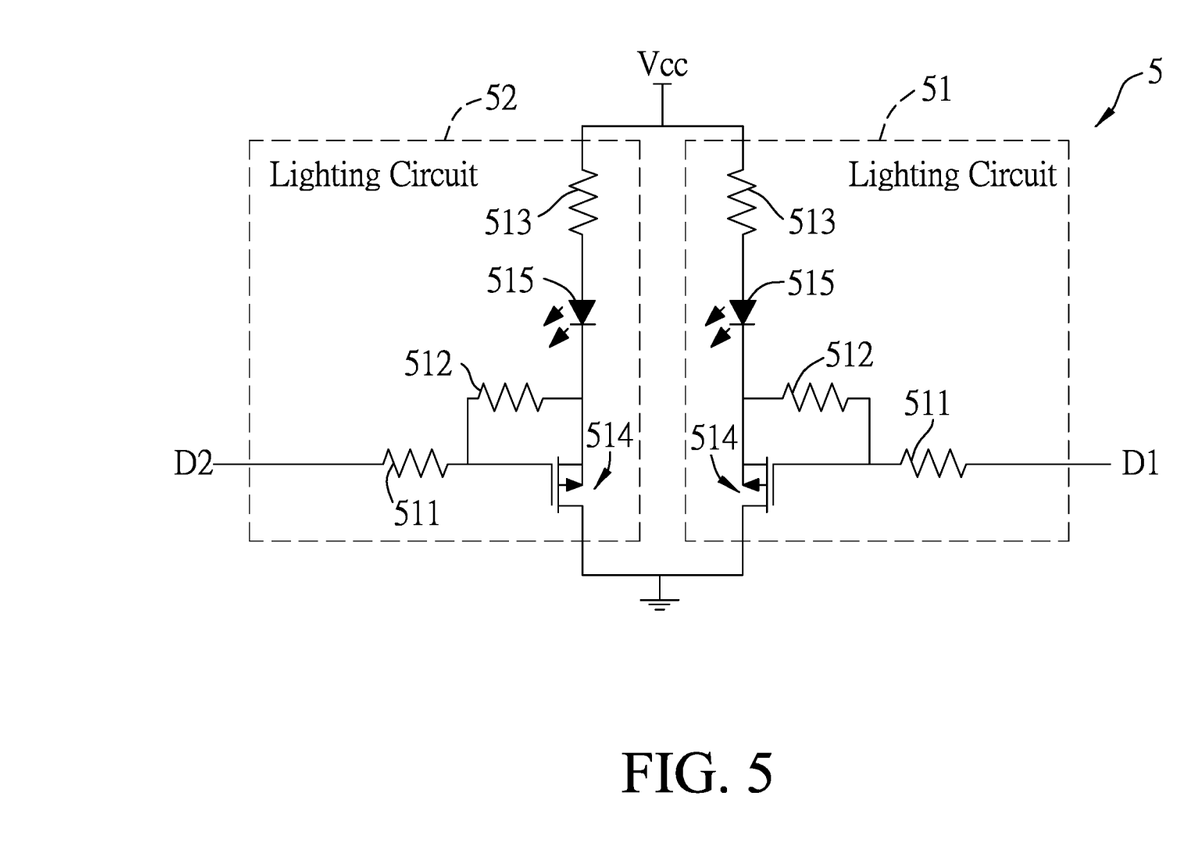
FIG. 5 is a circuit diagram of an indicating unit of the detection device according to an embodiment of this disclosure.

Referring to FIGS. 1 and 5, the indicating unit 5 is electrically connected to the power supply 11 to receive the first supply voltage (Vcc) therefrom, and is electrically connected to the detecting unit 2 to receive the first and second detection signals (D1, D2) therefrom. The indicating unit 5 is configured to generate a lighting output (Lo) based on the first supply voltage (Vcc) and the first and second detection signals (D1, D2).

In this embodiment, the indicating unit 5 includes two lighting circuits 51, 52 each electrically connected to the power supply 11 to receive the first supply voltage (Vcc). The lighting circuits 51, 52 are electrically connected to the detecting unit 2 to receive the first and second detection signals (D1, D2), respectively. Specifically, the lighting circuit 51 is configured to receive the first detection signal (D1) and to emit light serving as the lighting output based on the first detection signal (D1) and the first supply voltage (Vcc), and the lighting circuit 52 is configured to receive the second detection signal (D2) and to emit light serving as the lighting output based on the second detection signal (D2) and the first supply voltage (Vcc). Each of the lighting circuits 51, 52 includes first to third resistors 511-513, a transistor 514 and a light-emitting diode (LED) 515.

The first resistor 511 has a first end that is electrically connected to the detecting unit 2 to receive a corresponding one of the first and second detection signals (D1, D2), and a second end. The second resistor 512 has a first end that is electrically connected to the second end of the first resistor 511, and a second end. The third resistor 513 has a first end that is electrically connected to the power supply 11 to receive the first supply voltage (Vcc), and a second end. The transistor 514 has a first terminal that is electrically connected to the second end of the second resistor 512, a second terminal that is grounded, and a control terminal that is electrically connected to the first end of the second resistor 512. The LED 515 is configured to emit the light, and has a cathode and an anode that are electrically connected to the first terminal of the transistor 514 and the second end of the third resistor 513, respectively.

In this embodiment, when the inserted receiving card is the first card, the first detection signal (D1) is logic high and the second detection signal (D2) is logic low, so the LED 515 of the lighting circuit 52 emits the light to serve as the lighting output. When the inserted receiving card is the second card, the first detection signal (D1) is logic low and the second detection signal (D2) is logic high, so the LED 515 of the lighting circuit 51 emits the light to serve as the lighting output. The transistor 514 of each of the lighting circuits 51, 52 is a p-channel MOSFET, and the first terminal, the second terminal and the control terminal thereof are the source terminal, the drain terminal and the gate terminal, respectively.

Referring to FIG. 1, the output unit 6 includes a first signal input terminal (N1) electrically connected to the insertion slot 12 to receive therefrom the image signal (Dai) outputted by the inserted receiving card, a second signal input terminal (N2) electrically connected to the detecting unit 2 to receive the first detection signal (D1), and a signal output terminal (N3) that is adapted to be electrically connected to another LED display system (not shown). Specifically, said another LED display system has a circuit architecture similar to that of the LED display system 1, and the signal output terminal (N3) is electrically connected to an insertion slot of said another LED display system. The output unit 6 is configured to be controlled by the first detection signal (D1) to store a backup of the image signal (Dai) and transmit the image signal (Dai) to said another LED display system via the signal output terminal (N3) when the inserted receiving card is the first card, and to directly transmit the image signal (Dai) to said another LED display system via the signal output terminal (N3) without storing a backup when the inserted receiving card is the second card.

Specifically, the output unit 6 further includes a backup receiving card 61 and a switching unit 62. The backup receiving card 61 is of the same type as the first card (i.e., a receiving card developed by Novas tar Tech Co., Ltd.).

For example, the switching unit 62 may be a single pole double throw (SPDT) switch. The switching unit 62 includes a first input terminal (Q1) electrically connected to the first signal input terminal (N1) to receive the image signal (Dai), a second input terminal (Q2) electrically connected to the second signal input terminal (N2) to receive the first detection signal (D1), a first output terminal (Q3), and a second output terminal (Q4) electrically connected to the signal output terminal (N3). The switching unit 62 is controlled by the first detection signal (D1) to output the image signal (Dai) via the first output terminal (Q3) or the second output terminal (Q4). Specifically, when the inserted receiving card is the first card, the switching unit 62 outputs the image signal (Dai) via the first output terminal (Q3) in response to receipt of the logic-high first detection signal (D1). When the inserted receiving card is the second card, the switching unit 62 outputs the image signal (Dai) to said another LED display system via the second output terminal (Q4) and the signal output terminal (N3) in response to receipt of the logic-low first detection signal (D1).

The backup receiving card 61 includes an input pin electrically connected to the first output terminal (Q3) of the switching unit 62 for receiving the image signal (Dai) therefrom, and an output pin electrically connected to the signal output terminal (N3). In some embodiments, the output pin of the backup receiving card 61 is electrically connected further to the signal-generating unit 4. When the inserted receiving card is the first card, the backup receiving card 61 stores the backup of the image signal (Dai) and transmits the image signal (Dai) to said another LED display system via the output pin and the signal output terminal (N3) upon receiving the image signal (Dai) from the switching unit 62. Therefore, when the first card inserted into the insertion slot 12 is damaged, the backup receiving card 61 can be used to take the place of the first card to output the backup of the image signal (Dai) that is stored therein to said another LED display system and/or the signal-generating unit 4.

In summary, the detecting unit 2 is configured to automatically output the first and second detecting signals (D1, D2) and the voltage output (Vo) according to the type of the inserted receiving card, and to control operation of the buffer unit 3, the signal-generating unit 4 and the output unit 6 accordingly. Therefore, when the inserted receiving card has to be replaced with a different type of receiving card, the detection device 10 according to embodiments of this disclosure can still operate normally, allowing the LED display system 1 to function and display images well. That is to say, the LED display system 1 provided with the detection device 10 can work normally with different types of receiving cards, and it is not necessary to redesign the LED display system 1 for different types of receiving cards, avoiding the waste of research and development resources. In addition, the indicating unit 5 can generate different lighting outputs (Lo) (i.e., the light emitted by the lighting circuit 51 or the light emitted by the lighting circuit 52) according to the type of the inserted receiving card, allowing a user to know whether the inserted receiving card is the first card or the second card.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A detection device for detecting a receiving card removably inserted into an insertion slot of a light-emitting diode (LED) display system, the LED display system including the insertion slot and a display panel, the receiving card being one of a first card and a second card that are different types of receiving cards and that respectively output different identification signal outputs, the second card being configured to further output a control signal output, said detecting device comprising:
 a detecting unit adapted to receive a first supply voltage, and to be electrically connected to the insertion slot to receive therefrom the identification signal output outputted by the receiving card inserted into the insertion slot, said detecting unit being configured to
  generate a first detection signal and a second detection signal based on the identification signal output received from the insertion slot, the first and second detection signals having different phases that are opposite to each other and that vary according to a type of the receiving card inserted into the insertion slot, and
  generate a voltage output with reference to the first and second detection signals and the first supply voltage, the voltage output having a voltage value that varies according to the first and second detection signals;
 a buffer unit adapted to receive the first supply voltage, and to be electrically connected to the insertion slot, said buffer unit being electrically connected to said detecting unit to receive the voltage output and the first detection signal therefrom, said buffer unit being configured, when the receiving card inserted into the insertion slot is the second card, to
  receive the control signal output from the insertion slot,
  generate a high-impedance signal and a set of enabling signals according to the first detection signal that is generated by said detecting unit based on the identification signal output outputted by the second card,
  transmit the high-impedance signal to the receiving card through the insertion slot to enable the receiving card to generate an enabling output according to the high-impedance signal,
  according to the voltage output and the first detection signal, generate a buffered output based on the control signal output and the set of enabling signals, and
  transmit the buffered output to the display panel; and
 a signal-generating unit adapted to receive the first supply voltage, and to be electrically connected to the insertion slot to receive therefrom an image signal outputted by the receiving card inserted into the insertion slot, said signal-generating unit being electrically connected to said detecting unit to receive the voltage output and the second detection signal, said signal-generating unit being configured to
  when the receiving card inserted into the insertion slot is the first card, generate a first data output with reference to the first supply voltage, the voltage output, the second detection signal, and the image signal that is outputted by the first card, and transmit the first data output to the display panel to enable the display panel to display an image, and
  when the receiving card inserted into the insertion slot is the second card, further receive the enabling output from the insertion slot, generate a second data output with reference to the first supply voltage, the voltage output, the second detection signal, the enabling output, and the image signal that is outputted by the second card, and transmit the second data output to the display panel to enable the display panel to display an image.

2. The detection device of claim 1, wherein said detecting unit includes:
 a detecting circuit adapted to be electrically connected to the insertion slot to receive the identification signal output therefrom, and configured to generate the first and second detection signals based on the identification signal output received from the insertion slot; and
 a voltage-generating circuit adapted to receive the first supply voltage, electrically connected to said detecting circuit to receive the first and second detection signals therefrom, and configured to generate the voltage output with reference to the first and second detection signals and the first supply voltage.

3. The detection device of claim 2, the identification signal output including a first identification signal and a second identification signal, wherein said detecting circuit includes:
 a diode having an anode and a cathode, and adapted to be electrically connected to the insertion slot to receive the first and second identification signals at the anode and cathode, respectively;
 a first resistor having a first end that is electrically connected to said cathode of said diode, and a second end;
 a second resistor having a first end that is electrically connected to said second end of said first resistor, and a second end that is grounded;
 a first capacitor electrically connected to said second resistor in parallel;
 a first transistor having a first terminal, a second terminal that is grounded, and a control terminal that is electrically connected to said second end of said first resistor, said first transistor being configured to output the first detection signal at said first terminal thereof;
 a second capacitor having a first end that is electrically connected to said first terminal of said first transistor, and a second end that is grounded; and
 a second transistor having a first terminal, a second terminal that is grounded, and a control terminal that electrically connected to said first terminal of said first transistor, said second transistor being configured to output the second detection signal at said first terminal thereof.

4. The detection device of claim 2, wherein said voltage-generating circuit is configured to generate the voltage output to include a first voltage signal and a second voltage signal, and includes:
 a first resistor having a first end, and a second end that is electrically connected to said detecting circuit to receive the first detection signal therefrom;
 a second resistor having a first end that is adapted to receive the first supply voltage, and a second end that is electrically connected to said first end of said first resistor;

a first transistor having a first terminal that is electrically connected to said first end of said second resistor, a second terminal, and a control terminal that is electrically connected to said second end of said second resistor, said first transistor being configured to output the first voltage signal at said second terminal thereof;

a third resistor having a first end, and a second end that is electrically connected to said detecting circuit to receive the second detection signal therefrom;

a fourth resistor having a first end that is electrically connected to said first end of said second resistor, and a second end that is electrically connected to said first end of said third resistor;

a second transistor having a first terminal that is electrically connected to said first end of said fourth resistor, a second terminal, and a control terminal that is electrically connected to said second end of said fourth resistor, said second transistor being configured to output, based on the first supply voltage when said second transistor conducts, a voltage signal that serves as the second voltage signal at said second terminal thereof; and a voltage regulator electrically connected between said first and second terminals of said second transistor, and configured to reduce the first supply voltage to output a reduced output voltage that serves as the second voltage signal when said second transistor does not conduct.

5. The detection device of claim 1, wherein said buffer unit includes:

a signal-generating module that is adapted to be electrically connected to the insertion slot, that is electrically connected to said detecting unit to receive the first detection signal therefrom, and that is configured to generate the high-impedance signal and the set of enabling signals according to the first detection signal that is generated by said detecting unit based on the identification signal output outputted by the second card, and transmit the high-impedance signal to the receiving card through the insertion slot; and a buffer circuit that is adapted to receive the first supply voltage and to be electrically connected to the insertion slot to receive the control signal output from the insertion slot, that is electrically connected to said detecting unit to receive the voltage output and the first detection signal therefrom, and that is electrically connected to said signal-generating module to receive the set of enabling signals therefrom, wherein said buffer circuit is configured to be disabled according to the first detection signal that is generated according to the identification signal output outputted by the first card, wherein said buffer circuit is configured to be enabled according to the first detection signal that is generated based on the identification signal output outputted by the second card, to generate the buffered output based on the control signal output and the set of enabling signals, and to transmit the buffered output to the display panel.

6. The detection device of claim 5, wherein said signal-generating module includes:

a first resistor having a first end that is electrically connected to said detecting unit to receive the first detection signal therefrom, and a second end that is grounded;

a capacitor that is electrically connected to said first resistor in parallel;

a first transistor having a first terminal, a second terminal that is grounded, and a control terminal that is electrically connected to said first end of said first resistor;

a second resistor having a first end that is adapted to receive a second supply voltage different from the first supply voltage, and a second end that is electrically connected to said first terminal of said first transistor;

a third resistor having a first end that is adapted to receive the second supply voltage, and a second end;

a fourth resistor having a first end that is adapted to receive the second supply voltage, and a second end;

a signal-generating circuit electrically connected to said first terminal of said first transistor and said second ends of said third and fourth resistors, and configured to generate the set of enabling signals; and a second transistor having a first terminal that is adapted to be electrically connected to the insertion slot, a second terminal that is grounded, and a control terminal that is electrically connected to said detecting unit to receive the first detection signal therefrom, said second transistor being configured to output the high-impedance signal at said first terminal thereof according to the first detection signal.

7. The detection device of claim 6, wherein the set of enabling signals generated by said buffer unit includes two enabling signals, said signal-generating circuit includes two signal generators corresponding respectively to said third and fourth resistors, and each of said signal generators is configured to output a respective one of the enabling signals, and includes:

an output transistor having a first terminal that is electrically connected to said second end of the corresponding one of said third and fourth resistors, a second terminal, and a control terminal that is electrically connected to said first terminal of said first transistor, and being configured to output the respective one of the enabling signals at said second terminal thereof;

a switching transistor having a first terminal that is electrically connected to said second terminal of said output transistor, a second terminal, and a control terminal that is electrically connected to said first terminal of said first transistor; and a grounding resistor having a first end that is electrically connected to said second terminal of said switching transistor, and a second end that is grounded.

8. The detection device of claim 1, wherein said detecting unit is configured to generate the voltage output to include a first voltage signal and a second voltage signal, and said signal-generating unit includes:

a buffer that is adapted to receive the first supply voltage and to be electrically connected to the insertion slot to receive the image signal therefrom, that is electrically connected to said detecting unit to receive the second voltage signal therefrom, and that is configured to buffer the image signal into a buffered signal;

a switch that is adapted to receive the first supply voltage, that is electrically connected to said buffer to receive the buffered signal therefrom, that is electrically connected to said detecting unit to receive the second detection signal therefrom, and that is controlled by the second detection signal to output the first data output based on the buffered signal; and a flip-flop module that is adapted to be electrically connected to the insertion slot to receive the enabling output therefrom, that is electrically connected to said buffer and said detecting unit to respectively receive the buffered signal and the first voltage signal, and that is configured to be enabled by the enabling output to generate the second data output based on the buffered signal and the enabling output.

9. The detection device of claim 8, wherein the enabling output generated by the receiving card includes an enable signal, a first clock signal and a second clock signal, said flip-flop module is configured to generate the second data output to include a first data signal and a second data signal, and said flip-flop module includes:
  a first flip-flop circuit that is adapted to be electrically connected to the insertion slot to receive the enable signal and the first clock signal from the receiving card, that is electrically connected to said buffer and said detecting unit to respectively receive the buffered signal and the first voltage signal, and that is configured to be enabled by the enable signal to generate the first data signal based on the buffered signal and the first clock signal; and
  a second flip-flop circuit that is adapted to be electrically connected to the insertion slot to receive the enable signal and the second clock signal from the receiving card, that is electrically connected to said buffer and said detecting unit to respectively receive the buffered signal and the first voltage signal, and that is configured to be enabled by the enable signal to generate the second data signal based on the buffered signal and the second clock signal.

10. The detection device of claim 1, further comprising an indicating unit that is adapted to receive the first supply voltage, that is electrically connected to said detecting unit to receive the first and second detection signals therefrom, and that is configured to generate a lighting output based on the first supply voltage and the first and second detection signals.

11. The detection device of claim 10, wherein said indicating unit includes two lighting circuits that respectively receive the first and second detection signals, and each of said lighting circuits includes:
  a first resistor having a first end that is electrically connected to said detecting unit to receive the respective one of the first and second detection signals, and a second end;
  a second resistor having a first end that is electrically connected to said second end of said first resistor, and a second end;
  a third resistor having a first end that is adapted to receive the first supply voltage, and a second end;
  a transistor having a first terminal that is electrically connected to said second end of said second resistor, a second terminal that is grounded, and a control terminal that is electrically connected to said first end of said second resistor; and
  a light-emitting diode configured to emit light serving as the lighting output, and having a cathode and an anode that are electrically connected to said first terminal of said transistor and said second end of said third resistor, respectively.

12. The detection device of claim 1, further comprising an output unit that includes:
  a first signal input terminal that is adapted to be electrically connected to the insertion slot to receive therefrom the image signal outputted by the receiving card inserted into the insertion slot;
  a second signal input terminal that is electrically connected to said detecting unit to receive the first detection signal; and
  a signal output terminal that is adapted to be electrically connected to another LED display system,
  wherein said output unit is configured to be controlled by the first detection signal to
    store a backup of the image signal and transmit the image signal to said another LED display system via said signal output terminal when the receiving card inserted into the insertion slot is the first card, and
    directly transmit the image signal to said another LED display system via said signal output terminal without storing a backup when the receiving card inserted into the insertion slot is the second card.

13. The detection device of claim 12, wherein said output unit further includes:
  a switching unit that includes a first input terminal electrically connected to said first signal input terminal to receive the image signal, a second input terminal electrically connected to said second signal input terminal to receive the first detection signal, a first output terminal, and a second output terminal electrically connected to said signal output terminal, said switching unit being configured to be controlled by the first detection signal to
    output the image signal via said first output terminal when the receiving card inserted into the insertion slot is the first card, and
    output the image signal to said another LED display system via said second output terminal and said signal output terminal when the receiving card inserted into the insertion slot is the second card; and
  a backup receiving card that is the same type as the first card and that includes an input pin electrically connected to said first output terminal of said switching unit for receiving the image signal therefrom, and an output pin electrically connected to said signal output terminal, said backup receiving card being configured to store the backup of the image signal and to transmit the image signal to said another LED display system via said output pin and said signal output terminal when the receiving card inserted into the insertion slot is the first card.

* * * * *